United States Patent [19]

Matla et al.

[11] 4,208,685

[45] Jun. 17, 1980

[54] DISK STORAGE APPARATUS HAVING AN ELECTRICALLY TUNED HEAD-CARRIAGE ACTUATOR

[75] Inventors: Arno Matla; Horst D. Matthaei, both of Waldenbuch; Volker W. Zimmermann, Schoenaich, all of Fed. Rep. of Germany

[73] Assignee: International Business Machines Corporation, Armonk, N.Y.

[21] Appl. No.: 962,844

[22] Filed: Nov. 22, 1978

[30] Foreign Application Priority Data

Dec. 30, 1977 [DE] Fed. Rep. of Germany ....... 2759065

[51] Int. Cl.² ............................................... G11B 5/52
[52] U.S. Cl. ..................................... 360/107; 360/104
[58] Field of Search ..................... 360/104, 106–107, 360/109, 75; 274/23 R, 23 A

[56] References Cited

U.S. PATENT DOCUMENTS

| | | | |
|---|---|---|---|
| 2,776,560 | 1/1975 | Erath et al. | 73/71.2 |
| 3,884,316 | 5/1975 | Bowers | 74/230.17 E |
| 3,924,268 | 12/1975 | McIntosh | 360/78 |
| 4,113,265 | 9/1978 | Iyeta | 274/23 A |
| 4,121,837 | 10/1978 | Tominari et al. | 274/23 R |

*Primary Examiner*—John H. Wolff
*Attorney, Agent, or Firm*—Herbert F. Somermeyer

[57] ABSTRACT

In a signal storage apparatus employing a rotating record disk, the resonant frequency of a head carriage assembly is tuned to the rotational speed of the record disk. The head carriage assembly, in following a record track on the record disk, has to accommodate record disk rotational perturbations; i.e., run out, eccentric mounting, etc. Such variations are better accommodated in the head carriage assembly by electrically tuning the head carriage assembly to the rotation of the record disk. In a voice coil head assembly actuator, a pair of opposing coils carry equal current amplitudes. These equal current amplitudes are adjusted to rotational speed of the record disk to thereby continuously tune the head carriage assembly to the record disk rotation.

3 Claims, 5 Drawing Figures

DISK STORAGE APPARATUS HAVING AN ELECTRICALLY TUNED HEAD-CARRIAGE ACTUATOR

BACKGROUND OF THE INVENTION

The invention relates to spring-mass systems, particularly those used to support transducers in rotating record disk storage apparatus.

The natural frequency of a mechanical oscillator designed as spring-mass system is determined, by the mass of a movable body and the constants of the spring elements. The resonance frequency of such a mechanical oscillator is critical in the construction of machines and devices equipped with such oscillation systems. It is desired to avoid synchronous vibrations of the machine or adjacent components and component groups, whose components exhibit different resonance frequencies. However, the success of such avoidance can suffer if during machine operation the natural frequency of the machine changes. It is a common belief that all known spring-mass systems have a constant resonance frequency and that it cannot be balanced without altering the oscillating mass or changing the spring or springs. Such a situation exists in record disk storage apparatus, particularly in the transducer support mechanism.

A structure having a pair of electromagnetic coils on both sides of, and symmetrical to, a movable body is known, e.g. as used in a measuring device for seismic and gravitation measurings in accordance with U.S. Pat. No. 2,776,560. The movable body is an oscillator and analogously represents a measured value; however, it is not part of a spring mass system but is guided in the air gap of an electromagnetic field. The coil pairs have an additive effect for determining the resetting forces corresponding to the respective setting forces, and for generating the analog signals representing the setting paths.

On the other hand, dividing an electromagnetic working coil into coil halves, as such, is also known. Such coil halves can be effective either in an aiding or opposing directions. Such coil halves can center a movable element and stabilize it in a central position. However, depending on the direction and height of the deviation, such coil halves can still receive different current intensities for independent positioning correction.

SUMMARY OF THE INVENTION

It is the object of the present invention to provide a spring mass oscillation system and method such that a resonance frequency can be easily, electrically altered, and such that under varying operating conditions the natural frequency of the mechanical oscillator can be adapted to changing conditions or requirements.

According to the invention, a method and means tune the natural frequency of the mechanical oscillator to the frequency of a given speed of revolution or reciprocation otherwise occurring in the machine. For achieving this object, in accordance with the invention, a variable electrical spring constant in the mechanical oscillator system is effective in a deflected position of a movable mass as part of an actuating system, such as a voice coil system having two equal part coils or coil halves. Then, with regard to a balanced position of the movable mass, the coil halves are symmetrically arranged and equally protrude on both sides of the stationary magnetic field. The coils are fed with oppositely directed effective electrical currents of the same intensity for cancellation.

The part coils or coil halves provided in accordance with the invention are arranged and operated in such a manner that they only generate magnetic fields of the same extent and effect on both sides and of opposing field directions. Further, the consequences due to the geometry of the voice coil system, the coil halves exert a position-dependent displacement force, that is, there exists a spring constant caused by electrical quantities which are superimposed on the constant of the mechanic spring or springs. The extent of the increase or decrease of the mechanical spring constant is determined, with a predetermined coil size, by the respective uniform intensity of the effective currents applied to the two coil halves. The magnetic fields generated thereby cause forces in the line of the mechanical oscillation movements which cancel in the central position of the mechanical oscillator but which exert a resetting force as soon as the mechanical oscillator is deflected from such balanced or central position.

Preferably, a mechanical oscillation system designed in accordance with the present invention shows two part coils or coil halves with the same sense of winding for influencing the predetermined mechanic spring constant and which are energized with effective currents of the opposite direction. Such a design is particularly of advantage when the oscillating mass, in accordance with its function, is arranged in such a manner that it can be shifted from its neutral or balanced position, e.g. for frictionless following of an indicator, arm or similar element fixed thereto. In that case, the setting drive can be conveniently designed as a voice coil motor whose coil is divided into two equal coil halves. To these coil halves can be applied electrical currents formed of the two partial currents, i.e. the resulting current from the setting current and the effective current associated to each coil half. While, this design no additional coils are required; it is of course possible to arrange, additionally to the coil of the voice coil motor, other coils and to superimpose their respective magnetic fields to those of the setting drive. This design permits a greater choice of coils and the resultant magnetic fields generated by means of selecting the coil wire thickness and number of turns.

Below, the invention will be described by means of drawings with the example of an access device for a magnetic disk storage apparatus.

The foregoing and other objects, features, and advantages of the invention will be apparent from the following more particular description of preferred embodiments of the invention, as illustrated in the accompanying drawings.

THE DRAWINGS

Figure 1:
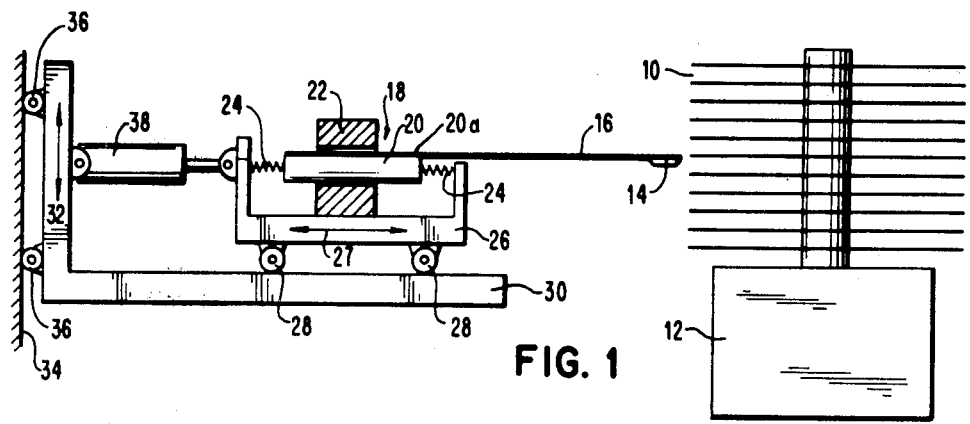
FIG. 1 is a schematic representation of the guiding and the setting drive of a magnetic head carrier arm for a magnetic disk storage.
Figure 3A:
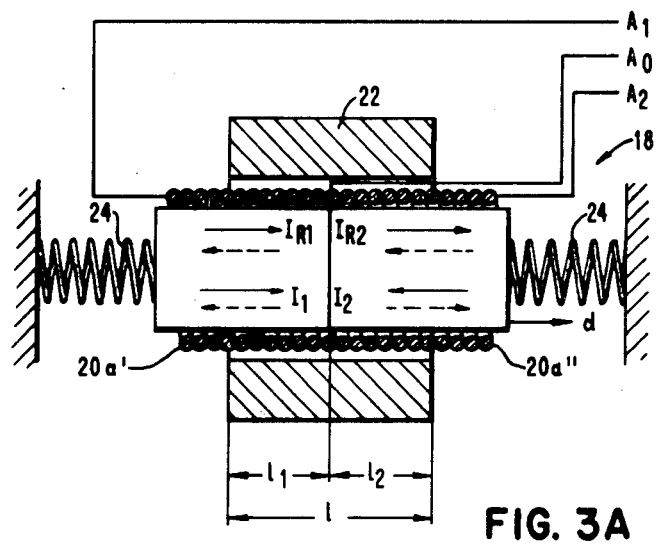

FIG. 3A schematically details the coil of the setting drive in accordance with FIG. 1.

Figure 3B:
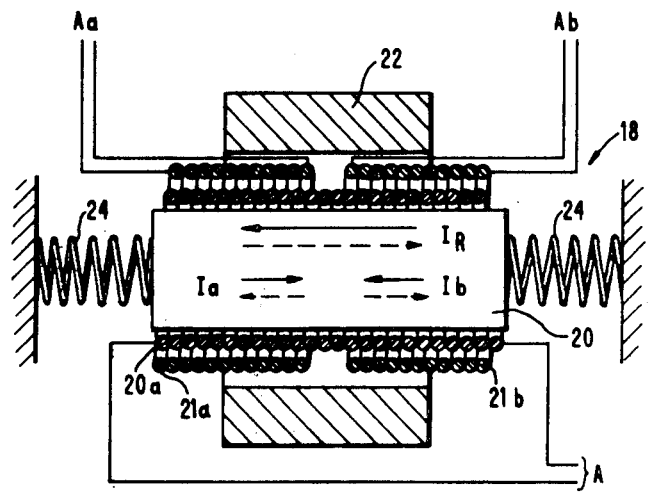

FIG. 3B shows an alternative design of the voice coil of the setting drive in accordance with FIG. 1.

Figure 4:
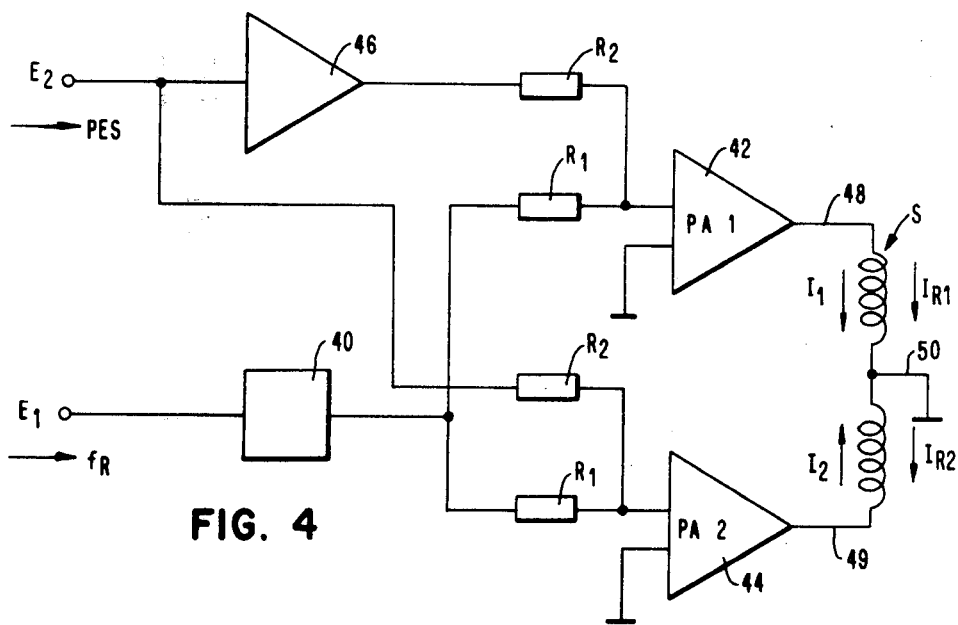

FIG. 4 shows a circuit for controlling the electrical currents of the coil halves in the electrical circuits of the FIG. 3A illustrated apparatus as a function of the storage disk rotational frequency.

DETAILED DESCRIPTION

Like numbers indicate like parts and structural features in the drawing figures. FIG. 1 shows a continuously rotating magnetic storage disk pack 10 driven by a disk pack driving motor 12. A magnetic head 14 for exchanging data signals with the disks in pack 10 is fixed to the end of head supporting arm 16. Arm 16 is in turn connected to coil body 20 having coil 20a of voice coil motor 18. The iron jacket 22 of voice coil motor 18 is supported on a movable platform or carriage 26, whereas coil body 20 is horizontally movably guided by springs 24 on platform 26 in a somewhat frictionless manner. As shown schematically in FIG. 1, platform 26 is movably guided on a platform carrier 30 by rollers 28 in the directions of double arrow 27. Platform carrier 30, rollers 36 and a supporting base 34 are vertically adjustable in the direction of double arrow 32. A radial driving cylinder 38 radially moves platform 26 relative to platform carrier 30 in the direction of double arrow 27. The driving device for the vertical adjustment of platform carrier 30 in the direction of double arrow 32 is not shown.

For recording data signals or for scanning recorded data signals on one of the disks of magnetic storage disk pack 10, platform carrier 30, with retracted driving cylinder 38, is first adjusted in the vertical direction in accordance with double arrow 32 in such a manner that magnetic head 14 is positioned adjacent a surface of a respective selected storage disk of disk pack 10. Subsequently, by means of driving cylinder 38, platform 26 is adjusted toward disk pack 10 until magnetic head 14 is at the record track selected for recording or scanning.

Due to the high density of the record tracks for the signal recording on a disk surface, the alignment of magnetic head 14 with respect to the selected record track has to be continuously controlled and, if necessary, corrected. Such a track following regulation can be controlled in various ways. For instance, the magnetic head 14 which records or scans the data signals can at the same time be used for scanning servo signals on the same circular track for controlling its track position, the servo signals being recorded either on a second magnetic layer of the disk, or in separate circumferential sectors. A track following regulation with improved response and speed consists in arranging in a movable support arm an adjustable magnetic head carrier whose drive is controlled as a servo device; the servo device responds to servo signals scanned by the magnetic head, by the amount of shifting between the movable support arm and the adjustable magnetic head carrier, and by the respective speed of the movable support arm all as shown in U.S. Pat. No. 3,924,268.

For satisfying high demands made to precisely control position and speed, a track following control system should be tuned to the natural frequency of the spring-mass system consisting of springs 24 and head support arm 16 with magnetic head 14. In this connection, use is made of the fact that in a stable control circuit for a spring-mass system the highest amplification is reached at the natural frequency of the mechanical control path. For that purpose the natural frequency of the spring-mass system is advisably provided at the position of the respective track follow-up error to be expected. In rotating systems, the highest radial deviation (out of round or eccentricity) from the record track to be expected is equal to, or is a multiple of the record disk revolution frequency. In record storage disks of flexible material, e.g., polyester foil, the highest radial deviation from the track is to be expected at twice the revolution frequency ($2f_R$). Since this foil material usually has a preferential direction it inevitably gains a certain elliptic deformation with time. For rigid storage disks having a metal base, the highest deviation corresponds to the resolution frequency $f_R$. Here changing packs can cause a certain eccentricity with respect to the driving shaft. The best results for the track following control are therefore obtained when the resonant frequency of the spring-mass system is tuned to the revolution frequency.

Figure 2:
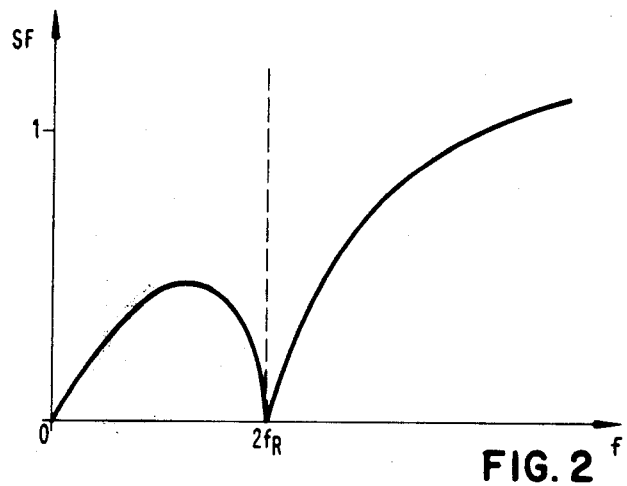
FIG. 2 is a diagram representing the course of the track follow-up error as a function of the rotation frequency for a storage disk with synthetic material as carrier.

FIG. 2 is a track follow-up error/frequency diagram showing ratios for a storage disk of synthetic material, e.g., a polyester foil. The abscissa is rotational frequency f; the ordinate is the track following error SF. The curve indicates the reduction of the track following error EF to a control algorithm balanced to twice the rotational frequency $2f_R$. If the frequency of the highest track following error shifts to $2f_R \pm \Delta f$, e.g., in case of fluctuation of the rotational frequency, the point of highest error reduction is also shifted. The corresponding detuning of the natural frequency of the spring mass system 20, 16, 14 with respect to the rotational frequency reduces the efficiency of the track following control. Two solutions to this problem are provided by the present invention are shown in FIGS. 3A and 3B. Please note that in both representations the magnetic resetting is not shown for the purpose of simplification.

In the embodiment according to FIG. 3A, the driving coil is divided into two coil halves $20a'$ and $20a''$ which via connections $A_1$, $A_0$, $A_2$, are connected to a control circuit. In the stationary or neutral central position of the system, both coil halves $20a'$ and $20a''$ are at length $l_1 = l_2$ in the magnetic field. The track following control induces in both coils an equal magnitude current of the same direction $$I_R(t) = I_R(t) + I_{R2}(t)$$

with the power effect $$F_e(t) = l \cdot B \cdot I_R(t)$$

with:
l = effective length of wire in the air gap,
B = magnetic induction.

If now $I_R(t)$ superimposes oppositely directed currents $I_1 + I_2 = 0$, there acts, at a deflection d from the stationary position, the repelling or driving force, depending on the direction of $I_1$ and $I_2$.

There follows from $I_1 = I_2$ $$F_e = \pm [I_1 + I_2] \cdot d \cdot B$$

Thus, the electric spring rate is $$D_e = \pm \frac{F_e}{d} = \pm (I_1 + I_2) \cdot B$$

therefore, the natural frequency of the spring-mass system changes to $$f = \frac{1}{2\pi}\sqrt{\frac{D_m \pm D_e}{M}}$$

with
- $D_m$ being the spring rate of the mechanical spring,
- $D_e$ the "electric spring rate", and
- $M$ the mass. If this value is compared with the natural frequency of a conventional spring mass system:

$$f = \frac{1}{2\pi}\sqrt{\frac{D_m}{M}}$$

it is evident that frequency f can be varied by altering the "electric spring rate", i.e., by simultaneously altering the electrical currents $I_1$ and $I_2$.

FIG. 3B shows an embodiment having coil motor 18 with driving coil 20a. There is provided two coil halves 21a and 21b. The displacement current for driving coil 20a is supplied via line connections A while the equal magnitude currents for coil halves 21a and 21b are supplied via separate lines Aa and Bb by a corresponding control circuit which alters intensity and direction of the oppositely directed currents $I_a$ and $I_b$ in accordance with the rotational frequency of the disk pack 10. The magnetic field generated by displacement current $I_R$ as well s the magnetic fields according to currents $I_a$ and $I_b$ are superimposed. The total effect on coil body 20 is the same as in the embodiment according to FIG. 3A. In the FIG. 3B embodiment, coil halves 21a and 21b give the advantage that driving coil 20 coil halves 21a and 21b can be independent of each other, both as to their wire size and number of turns.

A control circuit, as shown in FIG. 4, supplies the oppositely directed currents $I_1$ and $I_2$ (see FIG. 3A) in accordance with the rotational frequency of disk pack 10. The electrical current at input E1 of the circuit represents the rotational frequency $f_R$ of disk pack 10. Such electrical current can be from a generator or tachometer on the shaft of disk pack 10, motor 12 or from the magnetic and signals on a disk or disks in pack 10. The frequency of the signal represents the rotational frequency of disk pack 10. Frequency to voltage converter 40 converts the signal frequency to an analog voltage signal. The analog voltage signal goes through amplifiers 42 and 44 via resistors $R_1$. At the output side of amplifiers 42 and 44, lines 48 and 49 carry the analog signal to coil S, whose center tap is connected to ground via line 50, and through which flows oppositely directed currents $I_1$ and $I_2$. At input E2, the position error signal PES from a usual track following circuit (not shown) is applied. PES is an analog voltage signal showing how far off track transducer or head 14 is presently positioned with respect to a record track being followed. PES flows through a voltage level converter 46 and thence a resistor $R_2$ to amplifier 44 and through a second resistor $R_2$ to amplifier 42. Amplifiers 42,44 are of the differential type. Control currents $I_{R1}$ and $I_{R2}$ for the follow-up of the magnetic head via the spring mass system flow through coil S in the same direction.

Coil S with center tap connected in accordance with FIG. 4 corresponds, in the embodiment according to FIG. 3A, to the driving coil with coil halves 20a' and 20''; line 48 from amplifier 42 to coil S in accordance with FIG. 4 corresponds to line connection $A_1$ in FIG. 3A, line 49 corresponds to line connection $A_2$, and line 50 to ground corresponds to line connection $A_0$ according to FIG. 3A.

While the invention has been particularly shown and described with reference to preferred embodiments thereof, it will be understood by those skilled in the art that various changes in form and details may be made therein without departing from the spirit and scope of the invention.

What is claimed is:

1. A record storage apparatus having a rotatable record disk rotating at a nominal rotational frequency but subject to rotational frequency variations, a head carriage assembly having a head carriage portion movably mounted with respect to said record disk for radial movements along a surface of the record disk, electromagnetic actuator means in said head carriage assembly having a magnetically movable portion connected to said head carriage portion for imparting said radial movements to said head carriage portion, said head carriage portion and said electromagnetic actuator means exhibiting a given mechanical resonant frequency,
   the improvement comprising
   means for sensing and electrically indicating the rotational frequency and frequency variations of said rotating record disk, and
   additional means in said electromagnetic actuator means coupled to said sensing means and being responsive to said indication for applying predetermined opposing magnetic forces to said head carriage portion in proportion to said indication of said frequency variations for adjusting the dynamic mechanical operation of the head carriage portion and said electromagnetic actuator means from said exhibited mechanical resonant frequency to a dynamic mechanical resonant frequency tuned to the instantaneous rotational frequency of said record disk.

2. The apparatus set forth in claim 1 wherein said additional electromagnetic means has a plurality of electrical coils magnetically coupled to said magnetically movable portion and circuit means in said additional electromagnetic means for supplying electrical currents to said electrical coils in accordance with said indication such that magnetic fields for tuning the resonance of said head carriage portion and said electromagnetic actuator means are supplied to said electromagnetic actuator means.

3. The apparatus set forth in claim 2 wherein said plurality of electrical coils are two identical coils having a common connection to constitute a center-tapped coil means arranged to produce opposing magnetic forces on said magnetically movable portion and said circuit means having means for supplying an actuating current to said center-tapped coil means for imparting motion to said magnetically movable portion.

* * * * *